United States Patent
Tarman et al.

(12) 
(10) Patent No.: US 12,473,711 B2
(45) Date of Patent: Nov. 18, 2025

(54) SYSTEM AND METHOD FOR PROVIDING SUPPLEMENTAL HYDRAULIC POWER FOR AN ELECTRIC WORK VEHICLE

(71) Applicant: CNH Industrial America LLC, New Holland, PA (US)

(72) Inventors: Andrew Tarman, Dover, PA (US); Mark D. Dilts, Mohnton, PA (US)

(73) Assignee: CNH Industrial America LLC, New Holland, PA (US)

( * ) Notice: Subject to any disclaimer, the term of this patent is extended or adjusted under 35 U.S.C. 154(b) by 159 days.

(21) Appl. No.: 18/472,419

(22) Filed: Sep. 22, 2023

(65) Prior Publication Data
US 2025/0101709 A1    Mar. 27, 2025

(51) Int. Cl.
*E02F 3/84*    (2006.01)
*E02F 3/76*    (2006.01)
(Continued)

(52) U.S. Cl.
CPC ............ *E02F 3/844* (2013.01); *E02F 3/7618* (2013.01); *E02F 9/207* (2013.01); *E02F 9/2095* (2013.01);
(Continued)

(58) Field of Classification Search
CPC .......... F15B 1/024; F15B 1/027; F15B 1/033; F15B 11/165; F15B 21/02; F15B 21/087;
(Continued)

(56) References Cited

U.S. PATENT DOCUMENTS

| 3,964,260 A | 6/1976 | Williams et al. |
|---|---|---|
| 7,841,432 B2 | 11/2010 | Lynn et al. |

(Continued)

FOREIGN PATENT DOCUMENTS

| DE | 102015111926 A1 | 1/2017 |
|---|---|---|
| WO | WO2021/130497 A1 | 7/2021 |
| WO | WO2021/178200 A1 | 9/2021 |

OTHER PUBLICATIONS

Chen et al., Study on the Effect of Hydraulic Energy Storage on the Performance of Electro-Mechanical-Hydraulic Power-Coupled Electric Vehicles, Electronics, vol. 11, 2022, 3344. https://www.mdpi.com/2079-9292/11/20/3344/pdf.

(Continued)

*Primary Examiner* — Michael Leslie
(74) *Attorney, Agent, or Firm* — Dority & Manning, P.A.

(57) ABSTRACT

A system for providing supplemental hydraulic power for an electric work vehicle includes a hydraulic pump configured to supply pressurized hydraulic fluid through a hydraulic circuit to at least one hydraulic component, a hydraulic accumulator configured to provide a temporary supply of pressurized hydraulic fluid within the hydraulic circuit, a control valve configured to regulate the temporary supply of pressurized hydraulic fluid from the hydraulic accumulator to the hydraulic circuit, and a computing system communicatively coupled to the control valve. The computing system is configured to determine that an operation of the hydraulic component(s) is to be adjusted, determine an operational status of the hydraulic pump, and, when the pump is in a low output state, control the operation of the control valve to allow the hydraulic accumulator to provide the temporary supply of pressurized hydraulic fluid for adjusting the operation of the hydraulic component(s).

20 Claims, 3 Drawing Sheets

(51) Int. Cl.
*E02F 9/20* (2006.01)
*E02F 9/22* (2006.01)
*F15B 1/02* (2006.01)
*F15B 1/033* (2006.01)
*F15B 11/16* (2006.01)

(52) U.S. Cl.
CPC .......... *E02F 9/2217* (2013.01); *E02F 9/2246* (2013.01); *E02F 9/2267* (2013.01); *E02F 9/2271* (2013.01); *E02F 9/2289* (2013.01); *F15B 1/024* (2013.01); *F15B 1/033* (2013.01); *F15B 11/165* (2013.01)

(58) Field of Classification Search
CPC ....... E02F 9/207; E02F 9/2095; E02F 9/2217; E02F 9/2246
See application file for complete search history.

(56) References Cited

U.S. PATENT DOCUMENTS

| | | | |
|---|---|---|---|
| 8,297,198 | B2 | 10/2012 | Read |
| 9,346,207 | B2 | 5/2016 | Yuan |
| 9,975,426 | B2 | 5/2018 | McCann |
| 10,174,770 | B2 * | 1/2019 | Zhang ................... F15B 13/021 |
| 10,655,297 | B2 | 5/2020 | Stener et al. |
| 10,794,044 | B2 * | 10/2020 | Ogawa ................... E02F 9/2217 |
| 10,890,199 | B2 * | 1/2021 | Hahn ..................... F15B 1/033 |
| 10,927,854 | B2 | 2/2021 | Olesen et al. |
| 11,128,136 | B2 | 9/2021 | Abaitancei et al. |
| 11,149,409 | B2 | 10/2021 | Naya et al. |
| 11,976,676 | B2 * | 5/2024 | Quan ..................... F15B 1/024 |
| 2010/0122864 | A1 | 5/2010 | Rosman |
| 2016/0280071 | A1 | 9/2016 | Newman |
| 2016/0290367 | A1 * | 10/2016 | Lillemets ................ E02F 3/422 |

OTHER PUBLICATIONS

Hui et al., Hydraulic/Electric Synergy System (HESS) Design for Heavy Hybrid Vehicles, Energy, vol. 35, Issue 12, 2010, 5328-5335. https://www.sciencedirect.com/science/article/pii/S0360544210004020.

Hwang et al., Optimization and Application for Hydraulic Electric Hybrid Vehicle, Energies, vol. 13, Issue 2, 2020, 322. https://www.mdpi.com/1996-1073/13/2/322.

Wang et al., An Electric-Hydrostatic Energy Storage System for Hydraulic Hybrid Wheel Loader, IEEE Transactions on Vehicular Technology, vol. 71, No. 7, Jul. 2022, 13 Pages. https://ieeexplorer.iee.org/abstract/document/9757897.

Yang et al., Research on the Starting Acceleration Characteristics of a New Mechanical-Electric-Hydraulic Power Coupling Electric Vehicle, Energies, vol. 13, 2020, 6279. https://www.mdpi.com/1996-1073/13/23/6279.

Zhang et al., Extending Battery Lifetime for Electric Wheel Loaders with Electric-Hydraulic Hybrid Powertrain, Energy, vol. 261, 2022, 125190. https://www.sciencediret.com/science/article/pii/S0360544222020801.

* cited by examiner

SYSTEM AND METHOD FOR PROVIDING SUPPLEMENTAL HYDRAULIC POWER FOR AN ELECTRIC WORK VEHICLE

FIELD OF THE INVENTION

The present subject matter relates generally to hydraulic systems for electric work vehicles and, more particularly, to systems and methods for providing supplemental hydraulic power for electric work vehicles.

BACKGROUND OF THE INVENTION

Battery-powered electric work vehicles typically include one or more electric propulsion motors that are used to provide torque for driving the vehicle's drive system, such as by delivering torque to a transmission of the work vehicle or directly to the wheels. Additionally, in many instances, the electric propulsion motor(s) is also used to rotationally drive a hydraulic pump for supplying pressurized hydraulic fluid to the vehicle's hydraulic system. For instance, the pump may be used to provide pressurized hydraulic fluid for powering various hydraulic functions of the work vehicle, such as braking functions, loader functions, steering functions, hydraulic-remote functions, and/or the like.

During operation of current commercially available battery-powered electric work vehicles, the electric propulsion motor is run at all times to allow the pump to provide an instantaneous response of the various hydraulic functions of the electric work vehicle. However, such continuous motor operation drains the battery and, thus, limits the overall operating time of the work vehicle.

Accordingly, systems and methods for providing supplemental hydraulic power for electric work vehicles that allows for an instantaneous or near instantaneous response of the vehicle's hydraulic functions without requiring continuous operation of an electric motor of the work vehicle would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for providing supplemental hydraulic power for an electric work vehicle. The system includes an electric motor and a hydraulic pump coupled to the electric motor to allow the electric motor to rotationally drive the hydraulic pump, with the hydraulic pump being configured to supply pressurized hydraulic fluid through a hydraulic circuit to at least one hydraulic component of the electric work vehicle. The system also includes a hydraulic accumulator configured to provide a temporary supply of pressurized hydraulic fluid within the hydraulic circuit, a control valve configured to regulate the temporary supply of pressurized hydraulic fluid from the hydraulic accumulator to the hydraulic circuit, and a computing system communicatively coupled to the control valve. The computing system is configured to determine that an operation of the at least one hydraulic component is to be adjusted, determine an operational status of the hydraulic pump, and, in response to determining that the hydraulic pump is in a low output state, control the operation of the control valve to fluidly connect the hydraulic accumulator to the hydraulic circuit to allow the hydraulic accumulator to provide the temporary supply of pressurized hydraulic fluid for adjusting the operation of the at least one hydraulic component. In addition, the computing system is configured to control the operation of the control valve to fluidly disconnect the hydraulic accumulator from the hydraulic circuit after the operational status of the hydraulic pump has transitioned from the low output state to a normal output state.

In another aspect, the present subject matter is directed to a method for providing supplemental hydraulic power for an electric work vehicle. The electric work vehicle includes an electric motor and a hydraulic pump configured to be rotationally driven by the electric motor, with the hydraulic pump being configured to supply pressurized hydraulic fluid through a hydraulic circuit to at least one hydraulic component of the electric work vehicle. The method includes determining, with a computing system, that an operation of the at least one hydraulic component is to be adjusted, determining, with the computing system, an operational status of the hydraulic pump, and in response to determining that the hydraulic pump is in a low output state, controlling, with the computing system, an operation of a control valve to fluidly connect a hydraulic accumulator to the hydraulic circuit to allow the hydraulic accumulator to provide a temporary supply of pressurized hydraulic fluid for adjusting the operation of the at least one hydraulic component. The method also include controlling, with the computing system, the operation of the control valve to fluidly disconnect the hydraulic accumulator from the hydraulic circuit after the operational status of the hydraulic pump has transitioned from the low output state to a normal output state.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
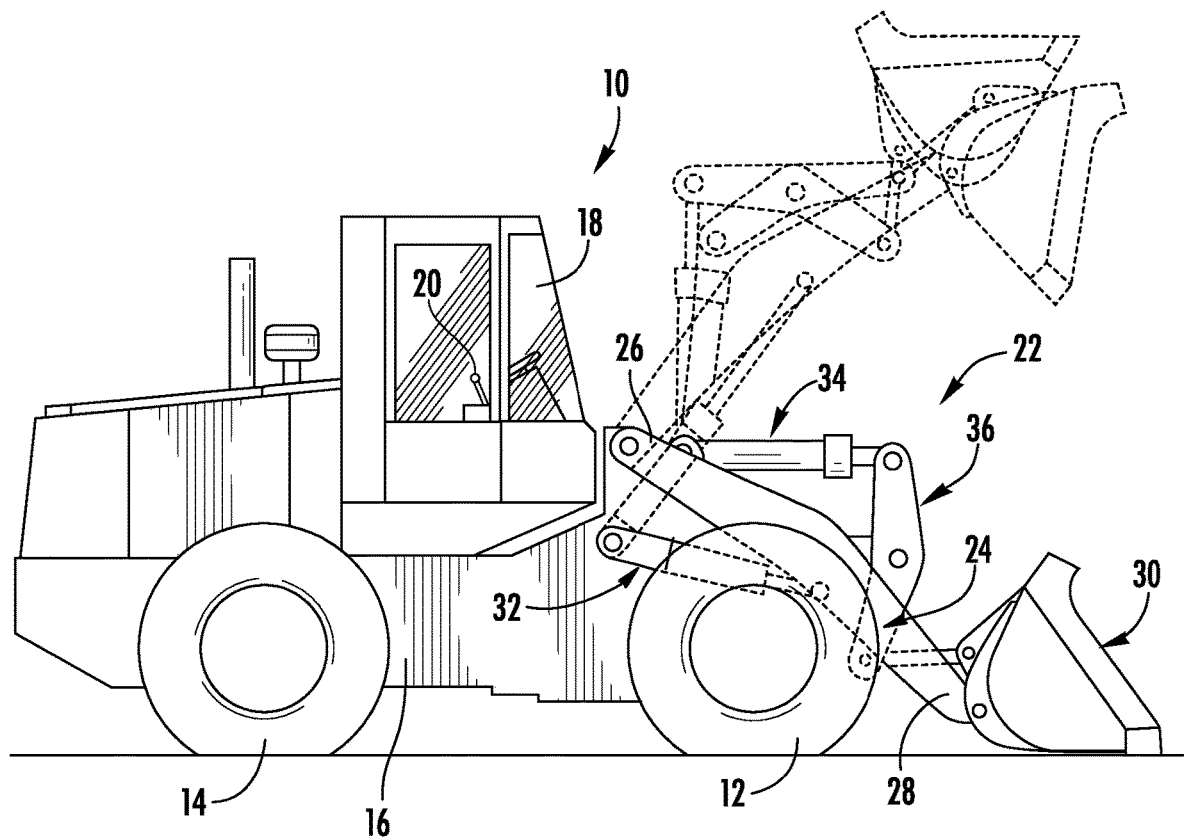
FIG. 1 illustrates a side view of one embodiment of an electric work vehicle in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for providing supplemental hydraulic power for an electric work vehicle. Specifically, in accordance with aspects of the present subject matter, the disclosed system incorporates a hydraulic accumulator and associated control valve that can be used to provide a temporary supply of pressurized hydraulic fluid within the hydraulic circuit of an electric work vehicle when the vehicle's pump is in a "low output state" (e.g., during the ramp-up period), thereby allowing the system to instantaneously (or near instantaneously) respond to operator-requested demands on the hydraulic system despite the operational status of the pump.

Such a configuration is particularly advantageous in instances in which the pump is rotationally driven by an electric motor of the work vehicle. In particular, by providing a supplemental source of instantaneous hydraulic power, the electric motor can be shut down during certain time periods (e.g., when the vehicle is in idle) to preserve battery life while avoiding the operational delay that would otherwise occur within the hydraulic system due to the motor (and, thus, the pump rotationally driven thereby) being non-operational at the instance at which an operator commands adjustments of one or more hydraulic components of the work vehicle. For instance, if the operator commands an adjustment to a given hydraulic component while the electric motor is not running or while the pump is otherwise in its "low output state", the control valve can be opened to allow the hydraulic accumulator to discharge hydraulic fluid into the circuit 108 to provide an instantaneous (or near instantaneous) response to the operator request.

Referring now to the drawings, FIG. 1 illustrates a side view of one embodiment of an electric work vehicle 10. As shown, the work vehicle 10 is configured as a battery-operated wheel loader. However, in other embodiments, the electric work vehicle 10 may be configured as any other suitable electric work vehicle known in the art, such as any other suitable construction-type work vehicle (e.g., skid steer loaders, backhoe loaders, compact track loaders, excavators, and/or the like) and/or any suitable agricultural work vehicle (e.g., tractors and/or the like).

As shown in FIG. 1, the work vehicle 10 includes a pair of front wheels 12, a pair or rear wheels 14 and a chassis 16 coupled to and supported by the wheels 12, 14. An operator's cab 18 may be supported by a portion of the chassis 16 and may house various control or input devices (e.g., levers, pedals, control panels, buttons and/or the like) for permitting an operator to control the operation of the work vehicle 10. For instance, as shown in FIG. 1, the work vehicle 10 may include one or more control levers 20 for controlling the operation of one or more components of a lift assembly 22 of the work vehicle 10.

As shown in FIG. 1, the lift assembly 22 may include a pair of loader arms 24 (one of which is shown) extending lengthwise between a first end 26 and a second end 28, with the first ends 26 of the loader arms 24 being pivotally coupled to the chassis 16 and the second ends 28 of the loader arms 24 being pivotally coupled to a suitable implement 30 of the work vehicle. (e.g., a bucket, fork, blade, and/or the like). In addition, the lift assembly 22 also includes a plurality of hydraulic actuators for controlling the movement of the loader arms 24 and the implement 30. For instance, the lift assembly 22 may include a pair of hydraulic lift actuators 32 (one of which is shown) coupled between the chassis 16 and the loader arms 24 for raising and lowering the loader arms 24 relative to the ground and a pair of hydraulic tilt actuators 34 (one of which is shown) for tilting or pivoting the implement 30 relative to the loader arms 24 (e.g., between dump and curl positions). As shown in the illustrated embodiment, each tilt actuator 34 may, for example, be coupled to the implement 30 via a linkage or lever arm 36. In such an embodiment, extension or retraction of the tilt actuators 34 may result in the lever arm 36 pivoting about a given pivot point to tilt the implement 30 relative to the loader arms 24.

It should be appreciated that the configuration of the electric work vehicle 10 described above and shown in FIG. 1 is provided only to place the present subject matter in an exemplary field of use. Thus, it should be appreciated that the present subject matter may be readily adaptable to any manner of work vehicle configuration.

Figure 2:
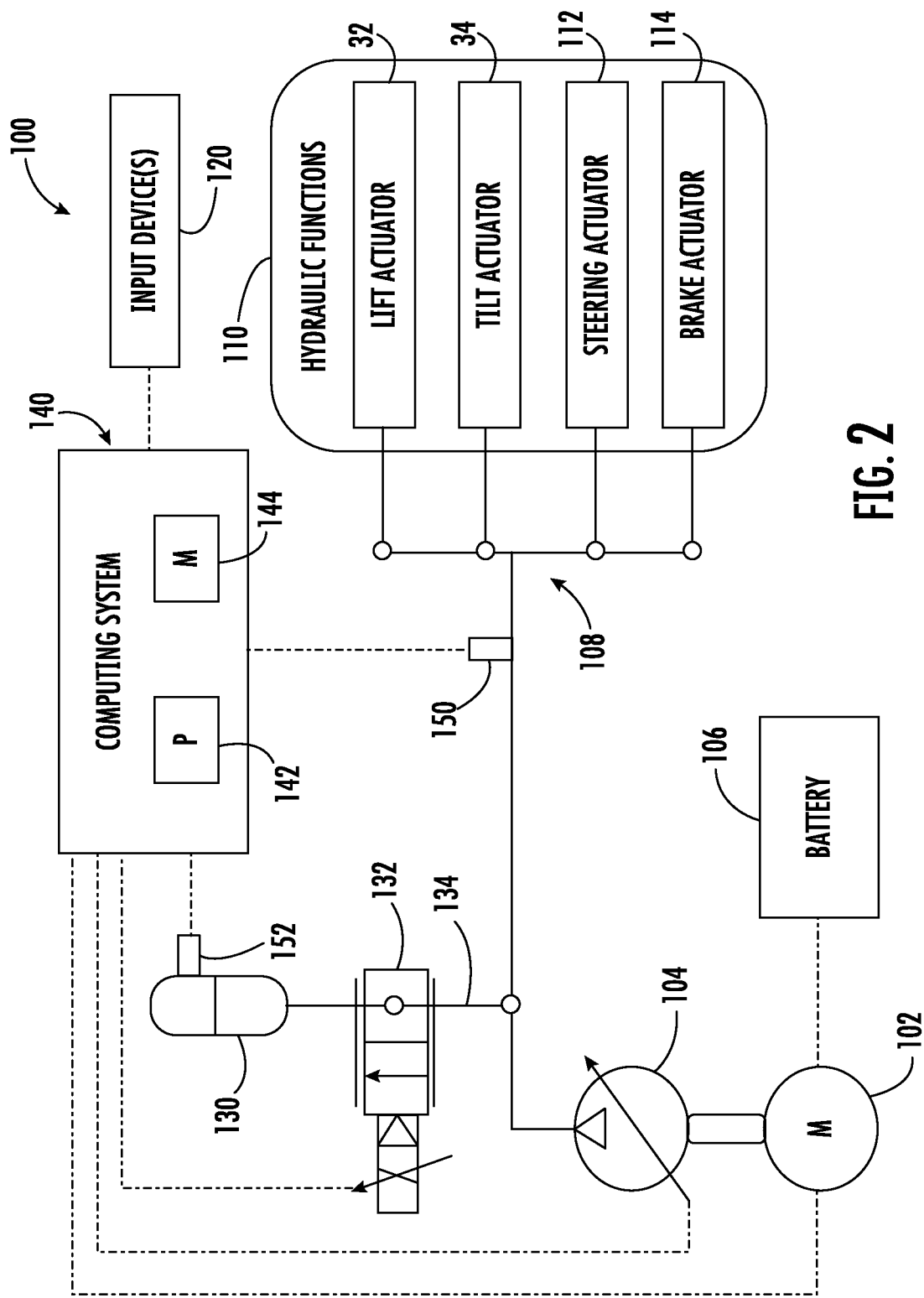
FIG. 2 illustrates a schematic diagram of one embodiment of a system for providing supplemental hydraulic power for an electric work vehicle in accordance with aspects of the present subject matter.

Referring now to FIG. 2, a schematic view of one embodiment of a system 100 for providing supplemental hydraulic power for electric work vehicles is illustrated in accordance with aspects of the present subject matter. In general, the system 100 will be described with reference to the electric work vehicle 10 shown in FIG. 1. However, it should be appreciated that the system 100 may be utilized with electric work vehicles having any other suitable vehicle configuration. For purposes of illustration, hydraulic connections are shown in FIG. 2 as solid lines while electrical connections or communicative links are shown in FIG. 2 as phantom lines.

As shown in FIG. 2, the system 100 may generally include an electric motor 102 for rotationally driving a hydraulic pump 104 and a battery module 106 for providing electrical power to the motor 102. The electric motor 102 may, in one embodiment, correspond to an electric propulsion motor of the work vehicle 10. Alternatively, the electric motor 102 may correspond to a dedicated electric motor for rotationally driving the pump 104. The battery module 106 may generally include one or more batteries configured to supply electrical power to the various powered components of the work vehicle 10. For instance, the battery module 106 may be configured similar to other battery packs, assemblies, or modules conventionally used with battery-powered vehicles.

As shown in FIG. 2, the hydraulic pump 104 may generally be configured to supply pressurized hydraulic fluid within an associated hydraulic circuit 108 of the work vehicle 10 for providing hydraulic power to the various hydraulic functions 110 of the work vehicle 10. For instance, in the illustrated embodiment, the pump 104 may be configured to supply pressurized hydraulic fluid for powering the tilt and lift functions of the lift assembly 22, such as by supplying pressurized hydraulic fluid to the lift actuator(s) 32 and/or tilt actuator(s) 34 of the lift assembly 22. Similarly, as shown in FIG. 2, the pump 104 may be configured to supply pressurized hydraulic fluid to various other hydraulic components of the work vehicle 10, such as a steering actuator 112 for controlling the steering function of the vehicle 10 and/or a brake actuator 114 for controlling the braking function of the vehicle 10. One of ordinary skill in the art will appreciate that the work vehicle 10 may further include various other hydraulic functions 110 that are powered via the pressurized hydraulic fluid supplied through the hydraulic circuit 108.

While the motor 102 is running and, thus, rotationally driving the hydraulic pump 104, the pump 104 is generally capable of instantaneously (or near instantaneously) responding to demands on the hydraulic system, such as when the operator provides an input (e.g., via an associated input device(s) 120 of the work vehicle 10, such as the control lever 20 described above) to adjust the operation of one or more hydraulic components of the work vehicle 10. For instance, the operator may provide an operator input via the input device(s) 120 commanding adjustments to the operation of the lift assembly 22, such as by commanding that the lift actuator(s) 32 be actuated to raise or lower the boom or by commanding that the tilt actuator(s) 34 be actuated to tilt the implement up or down relative to the boom. Similarly, the operator may provide an operator input via the input device(s) 120 commanding adjustments to the operation of other suitable hydraulic components of the work vehicle 10, such as by commanding that the steering actuator(s) 112 be actuated to steer the vehicle 10 or by commanding that the brakes actuator(s) 114 be actuated to apply the vehicle's brakes. In such instances, with the motor 102 running, the hydraulic pump 104 can respond instantaneously (or near instantaneously) to such operator-requested demands on the hydraulic system.

However, as indicated above, it is often desirable to turn off the electric motor 102 to conserve battery power in certain instances (e.g., when the vehicle is in idle), in which case the hydraulic pump 104 is no longer operating. In such instances, when the operator provides an input commanding that adjustments be made to the operation of one or more hydraulic components of the work vehicle 10, there can be a significantly delay in the responsiveness of the hydraulic system as the pump 104 ramps-up upon initiation of the electric motor 102. For example, the ramp-up period for some hydraulic pumps may be one to five seconds. In general, the operational status of the pump 104 prior to initiation of the electric motor 102 and during the ramp-up period is referred to herein as a "low output state", within which the pump 104 is either providing no output (e.g., because it is not being driven by the motor 102) or is providing an output that is lower than a predetermined or commanded threshold for the system 100. For instance, during the ramp-up period, the "low output state" of the pump 104 may be characterized by a pump output (e.g., an output pressure and/or flow rate) that is lower than a threshold output required to satisfy the hydraulic operation being commanded by the operator or a pump output that is lower than a predetermined output threshold set for the pump 104 (e.g., a predetermined output pressure and/or flow rate). In addition (or as an alternative thereto), the "low output state" of the pump 104 may be characterized by a pump speed that is lower than a predetermined operating speed set for the pump 104. Once the pump 104 ramps-up to (and above) the required/predetermined threshold value (e.g., a threshold pump output or threshold speed), the operational status of the pump 104 is generally referred to herein as a "normal output state" of the pump 104.

To address the above-described issue, the disclosed system 100 incorporates a hydraulic accumulator 130 and associated control valve 132 that can be used to provide a temporary supply of pressurized hydraulic fluid within the hydraulic circuit 108 while the pump 104 is in the "low output state" (e.g., during the ramp-up period), thereby allowing the system 100 to instantaneously (or near instantaneously) respond to operator-requested demands on the hydraulic system. For instance, if the operator commands an adjustment to a given hydraulic component while the electric motor 102 is not running or while the pump 104 is otherwise in its "low output state", the control valve 132 can be opened to allow the hydraulic accumulator 130 to discharge hydraulic fluid into the circuit 108 to provide an instantaneous (or near instantaneous) response to the operator request. Once the pump 104 sufficiently ramps-up to its "normal output state", the pump 104 can take over as the primary supplier of pressurized hydraulic fluid within the system 100, in which case the control valve 132 can be closed to disconnect the accumulator 130 from the circuit 108 (e.g., after sufficient re-charging of the accumulator).

As shown in FIG. 2, the hydraulic accumulator 130 may be fluidly coupled to the hydraulic circuit 108 via a suitable hydraulic connection, such as accumulator line 134. In general, the accumulator 130 may be configured as any suitable type of hydraulic accumulator that allows it to function as described herein. For instance, in one embodiment, the accumulator 130 may correspond to a diaphragm-type (or bladder-type) accumulator. In another embodiment, the accumulator 130 may correspond to a spring-type accumulator, a weight-loaded piston-type accumulator, and/or any other suitable type of accumulator.

Additionally, as shown in FIG. 2, the control valve 132 may be fluidly coupled between the accumulator 130 and the hydraulic circuit 108 (e.g., by being provided along the accumulator line 134) to regulate the flow of pressurized hydraulic fluid supplied from the accumulator 130 to the hydraulic circuit 108 (and vice versa). In one embodiment, the control valve 132 may be configured as a proportional directional control valve, thereby allowing the valve 132 to be used to proportionally regulate the output of the accumulator 130 into the hydraulic circuit 108 during a discharge mode of the accumulator 130 and also proportionally regulate the input into the accumulator 130 from the circuit 108 during a re-charge mode of the accumulator 130. As will be described below, such proportional valve control may be based on the hydraulic requirements associated with an operator input received via an associated input device 120 or may be based on sensor feedback associated with a parameter of the hydraulic fluid being supplied through the circuit 108 (e.g., the pressure of the hydraulic fluid).

Referring still to FIG. 2, the system 100 may also include a computing system 140 and various components, features, systems and/or sub-systems configured to be communicatively coupled to the computing system 140. In general, the computing system 140 may be configured to perform various computer-related functions or tasks, including, for example, receiving data from one or more components, features, systems and/or sub-systems of the work vehicle 10 (e.g., from input devices 120, sensors, and/or the like), storing and/or processing data received or generated by the computing system 140, and/or controlling the operation of one or more components, features, systems and/or sub-systems of the electric work vehicle 10. For example, the computing system 140 may be configured to electronically control the operation of the electric motor 102, hydraulic pump 104, control valve 132 and/or any other suitable component of the disclosed system 100 and/or relative work vehicle 10.

In general, the computing system 140 may correspond to any suitable processor-based device(s), such as a computing device or any combination of computing devices. Thus, as shown in FIG. 2, the computing system 140 may generally include one or more processor(s) 142 and associated memory devices 144 configured to perform a variety of computer-implemented functions (e.g., performing the methods, steps, algorithms, calculations, and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device 144 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device 144 may generally be configured to store information accessible to the processor(s) 142, including data that can be retrieved, manipulated, created and/or stored by the processor(s) 142 and instructions that can be executed by the processor(s) 142.

In accordance with aspects of the present subject matter, the computing system 140 may be configured to automatically control the operation of the control valve 132 to allow the hydraulic accumulator 130 to provide a temporary supply of pressurized hydraulic fluid within the hydraulic circuit 108 in instances in which the hydraulic pump 104 is in its "low output state". Specifically, in several embodiments, the computing system 140 may be configured to determine that the operation of a hydraulic component of the electric work vehicle 10 is to be adjusted (e.g., by receiving an operator input commanding such adjustment or by predicting that an upcoming adjustment is to be made). In response to such a determination, the computing system 140 may be configured to determine the operational status of the hydraulic pump 104. In the event that the pump 104 is currently in its "low output state", the computing system 140 may be configured to open the control valve 132 to fluidly connect the accumulator 130 to the hydraulic circuit 108, thereby allowing the accumulator 130 to provide a temporary supply of pressurized hydraulic fluid for powering the hydraulic component(s). In addition, the computing system 140 may simultaneously control the operation of the electric motor 102 and/or the hydraulic pump 104 to ensure that the pump 104 is ramped-up to its "normal output state". For instance, if the electric motor 102 is not currently running, the computing system 140 may be configured to activate the motor 102 in a manner that spools-up the pump 104 to the required/predetermined output and/or speed associated with its "normal output state". Alternatively, if the pump 104 is already in its "normal output state" when the computing system 140 determines that the operation of a given hydraulic component is to be adjusted, there is no need to open the control valve 132, as the pump 104 can be used to effectively provide the required hydraulic output through the circuit 108.

In one embodiment, the computing system 140 may be configured to determine that the operation of a given hydraulic component is to be adjusted based on the receipt of an operator input from an associated input device 120. For instance, the computing system 140 may be communicatively coupled to the input device(s) 120 of the electric work vehicle 10, thereby allowing the computing system 140 to receive operator inputs through the input device(s) 140 commanding adjustments to the operation of one or more hydraulic components of the work vehicle 10, such as the lift actuator(s) 32, tilt actuator(s) 34, the steering actuator(s) 112, the brake actuator(s) 114, and/or the like. Upon receipt of the operator input, the computing system 140 may determine the appropriate control commands for actuating or otherwise adjusting the operation of the hydraulic component(s) in accordance with the operator's request.

Alternatively, the computing system 140 may be configured to determine that the operation of a given hydraulic component is to be adjusted based at least in part on a predicted future adjustment of the hydraulic component. For instance, in one embodiment, the computing system 140 may be configured to recognize a pattern of input commands received over a given period of time for adjusting the operation of a hydraulic component and, based on such pattern recognition, predict when a future adjustment of such component will be made. For instance, if the operator is providing repetitive commands at a given frequency or specific commands when the work vehicle 10 has a given operating state or condition, the computing system 140 may be adapted to recognize the pattern or conditions associated with such commands and predict when an upcoming adjustment will be made to the same hydraulic component. In such embodiments, the computing system 140 may be configured to implement a machine-learned model (e.g., a Neural Network) that outputs predictions for future adjustments of a given hydraulic component based on one or more inputs into the model, such as prior adjustments/commands related to the component, various operating states/conditions of the work vehicle 10, and/or the like.

In addition to pattern recognition (or as an alternative thereto), the computing system 140 may be configured to predict a future adjustment of a given hydraulic component based on predetermined or prescribed adjustments for such hydraulic component. For example, the work vehicle 10 may be provided with a prescription map or control instructions for performing a given operation(s) at certain locations within a field or operating site, at a certain frequency, and/or according to certain pre-set criteria. In such instances, the computing system 140 may be configured to predict when a related hydraulic component will be actuated based on the prescribed adjustments. For instance, when operating according to a prescription map, the computing system 140 may be configured to continuously monitor the geospatial coordinates of the work vehicle 10 (e.g., via a GPS receiver) and geo-reference such coordinates to the associated prescription map. Thus, as the work vehicle 10 nears a location at which a prescribed adjustment is to be made to a given hydraulic component, the computing system 140 may predict that such adjustment is likely to be made in the near future based on the current heading/speed of the work vehicle 10.

Once the computing system 140 determines that the operation of a given hydraulic component is to be adjusted, the computing system 140 is configured to verify or check the operational status of the pump 104 to determine whether the pump 104 is currently in its "low output state" or its "normal output state". As indicated above, the "low output state" of the pump 104 is generally characterized by either the pump 104 being in an "off state" (i.e., when the pump 104 is not providing any output, such as when the motor 102 is turned off) or the pump 104 being in an operational or "on state" but still providing an output or having an operating characteristic or parameter that is below a given threshold (e.g., predetermined setting or desired/commanded output). For instance, as the pump 104 is being ramped-up towards its "normal output state", the "low output state" of the pump 104 may be characterized by a pump output (e.g., an output pressure and/or flow rate) that is lower than the pump output required to satisfy the hydraulic operation being commanded by the operator or a pump output that is simply lower than a predetermined output set for the pump 104. In addition (or as an alternative thereto), the "low output state" of the pump 104 may be characterized by a pump speed than a predetermined operating speed set for the pump 104. Thus, in several embodiments, the computing system 140 may be configured to determine the operational status of the pump 104 by: (1) determining whether the pump 104 is currently in its "off state" (i.e., by determining whether the pump 104, itself, is operating or whether the electric motor 102 configured to drive the pump 104 is operating); and (2), when the pump 104 is operational or in the "on state", determining whether a related pump parameter is below an associated threshold. For instance, the computing system 140 may initially check to see if the pump 104 is in the "off state" and, if so, identify the operational status of the pump 104 as being in the "low output state". If it is, instead, determined that the pump 104 is currently running, the computing system 140 may determine whether the related pump parameter is below the associated threshold, such as by determining whether the pump output is below a predetermined or commanded/required output for the pump 104 or by determining whether the pump speed is below a predetermined operating speed for the pump 104. If the related pump parameter is below the threshold, the computing system 140 may identify the operational status of the pump 104 as being the "low output state". Alternatively, if the related pump parameter is above the threshold, the computing system 140 may identify the operational status of the pump 104 as being the "normal output state".

As indicated above, upon determining that the pump 104 is in its "low output state" the computing system 140 is configured to control the operation of the control valve 132 to allow the accumulator 130 to provide a temporary supply of pressurized hydraulic fluid within the hydraulic circuit 108 for powering the hydraulic component(s). Specifically, the computing system 140 may be configured to open the control valve 132 to fluidly connect the accumulator 130 to the hydraulic circuit 108, thereby allowing the pressurized hydraulic fluid stored within the accumulator 130 to be discharged therefrom. In several embodiments, the computing system 140 is configured to proportionally control the opening of the valve 132 based on one or more inputs received by the computing system 140 to regulate the supply of pressurized hydraulic fluid provided within the circuit 108 by the accumulator 130. For instance, in one embodiment, the proportional valve control executed by the computing system 140 may be based on the operator input provided via the associated input device 120. As an example, when the operator is actuating a lever or joystick, the magnitude and/or rate of movement of the lever/joystick generally corresponds to the extent and/or speed at which the associated hydraulic component is to be actuated in response to such operator command, which, in turn, is generally associated with a hydraulic demand or requirement on the hydraulic system. Thus, in response to the receipt of operator inputs in instances in which the pump 104 is in its "low output state", the computing system 140 may be configured to proportionally control the operation of the control valve 132 in a manner that ensures that the supply of pressurized hydraulic fluid from the accumulator 130 satisfies or meets the hydraulic demand on the system 100 deriving from the operator's input command.

In addition to such valve control (or as an alternative thereto), the computing system 140 may be configured to implement closed-loop control of the valve 132 based on feedback that is associated with one or more parameters of the hydraulic fluid being supplied through the circuit 108. For instance, as shown in FIG. 2, one or more fluid parameter sensors 150 (e.g., a pressure sensor and/or flow rate sensor) may be provided in fluid communication with the hydraulic circuit 108 to monitor the associated parameter and provide feedback to the computing system 140. Based on such feedback, the computing system 140 may execute closed-loop control of the valve 132 to ensure that the output from the accumulator 130 maintains the monitored parameter within the circuit 108 at a desired or predetermined setting, such as a desired pressure and/or desired flow rate.

It should be appreciated that, once the operational status of the hydraulic pump 104 has transitioned from the "low output state" to the "normal output state", the pump 104 generally becomes the primary source of pressurized hydraulic fluid within the circuit 108. At such point, as opposed to immediately closing the control valve 132 to disconnect the accumulator 130 from the hydraulic circuit 108, the control valve 132 may be maintained in an open position for a short period of time to allow the accumulator 130 to be re-charged by the pump 104. Specifically, upon the hydraulic pump 104 transitioning from the "low output state" to its "normal output state, the accumulator 130 may similarly transition from a discharge mode to a charge mode. In the charge mode, the pressurized fluid supplied by the pump 104 may be directed through the control valve and into the accumulator 130 to re-charge the accumulator 130 to a desired or predetermined charge pressure. In this regard, as shown in FIG. 2, the system 100 may, in one embodiment, include a pressure sensor 152 fluidly coupled to the accumulator 130 that is configured to provide an indication of the charge pressure therein. As such, by monitoring the charge pressure within the accumulator 130 via the data provided by the pressure sensor 152, the computing system 140 may be configured to determine when the accumulator 130 has been fully re-charged (e.g., when the monitored charge pressure is equal to the predetermined charge pressure), at which point the computing system 140 may be configured to actuate the control valve 132 to its closed position, thereby disconnecting the accumulator 130 from the circuit/pump.

It should also be appreciated that the data provided by the pressure sensor 152 may also be used by the computing system 140 while the accumulator 130 is in its discharge mode to ensure that the charge pressure within the accumulator 130 does not drop below a certain minimum charge pressure. For instance, the computing system 140 may be configured to continuously monitor the charge pressure of the accumulator 130 during discharge thereof and, in the event the charge pressure reaches or drops below the minimum charge pressure, the computing system 140 can close the control valve 132 to prevent an over-discharged condition of the accumulator 130.

Figure 3:
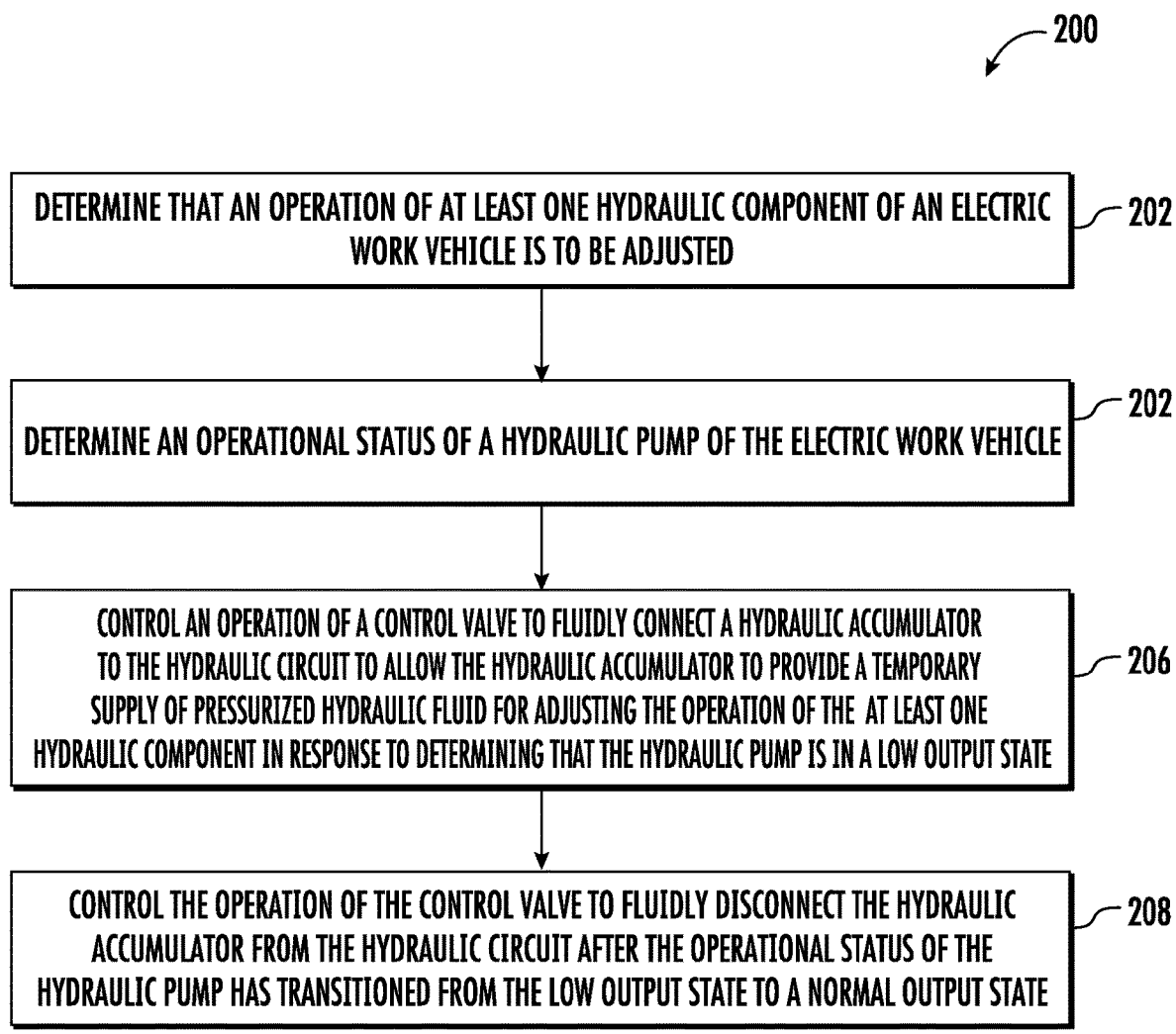
FIG. 3 illustrates a flow diagram of one embodiment of a method for providing supplemental hydraulic power for an electric work vehicle in accordance with aspects of the present subject matter.

Referring now to FIG. 3, a flow diagram of one embodiment of a method 200 for providing supplemental hydraulic power for an electric work vehicle is illustrated in accordance with aspects of the present subject matter. In general, the method 200 will be described herein with reference to the electric work vehicle 10 described above with reference to FIG. 1 and the system 100 described above with reference to FIG. 2. However, it should be appreciated by those of ordinary skill in the art that the disclosed method 200 may be implemented in association with any other electric work vehicles having any other suitable vehicle configuration and/or within any other system having any other suitable system configuration. In addition, although FIG. 3 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 3, at (202), the method 200 may include determining that an operation of at least one hydraulic component of an electric work vehicle is to be adjusted. As indicated above, the computing system 140 may be configured to make such a determination based on an input(s) received from the operator (e.g., via an associated input device(s) 120) that is associated with controlling the operation of the hydraulic component(s) and/or based on predicted future adjustments of the operation of the hydraulic component(s).

Additionally, at (204), the method 200 may include determining an operational status of a hydraulic pump of the electric work vehicle. As indicated above, the computing system 140 may, in one embodiment, be configured to determine the operational status of the pump 104 by: (1) determining whether the pump 104 is currently in its "off state" (i.e., by determining whether the pump 104, itself, is operating or whether the electric motor 102 configured to drive the pump 104 is operating); and (2), when the pump 104 is operational or in the "on state", determining whether a related pump parameter is below an associated threshold.

Moreover, at (206), the method 200 includes controlling an operation of a control valve to fluidly connect a hydraulic accumulator to the hydraulic circuit to allow the hydraulic accumulator to provide a temporary supply of pressurized hydraulic fluid for adjusting the operation of the at least one hydraulic component in response to determining that the hydraulic pump is in a low output state. Specifically, as indicated above, when the pump 104 is in its "low output state", the computing system 104 may be configured to open the control valve 132 to connect the accumulator 130 to the hydraulic circuit 1108, thereby allowing the accumulator 130 to provide a temporary supply of pressurized hydraulic fluid through the circuit 108.

Referring still to FIG. 3, at (208), the method 200 includes controlling the operation of the control valve to fluidly disconnect the hydraulic accumulator from the hydraulic circuit after the operational status of the hydraulic pump has transitioned from the low output state to a normal output state. For instance, as indicated above, the computing system 140 may be configured to close the control valve 132 once: (1) the operational status of the pump 104 has transitioned from the low output state to a normal output state; and (2) the accumulator 130 has been charged to a predetermined charge pressure.

It is to be understood that the steps of the method 200 are performed by the computing system 140 upon loading and executing software code or instructions, which are tangibly stored on one or more tangible computer readable media, such as on one or more magnetic media (e.g., a computer hard drive(s)), one or more optical media (e.g., an optical disc(s)), solid-state memory (e.g., flash memory), and/or other storage media known in the art. Thus, any of the functionality performed by the computing system 140 described herein, such as the method 200, is implemented in software code or instructions, which are tangibly stored on the one or more tangible computer readable media. The computing system 140 loads the software code or instructions via a direct interface with the one or more computer readable media or via a wired and/or wireless network. Upon loading and executing such software code or instructions by the computing system 140, the computing system 140 may perform any of the functionality of the computing system 140 described herein, including any steps of the above-described method 200.

The term "software code" or "code" used herein refers to any instructions or set of instructions that influence the operation of a computing system, such as one or more computers or one or more controllers. They may exist in a computer-executable form, such as machine code, which is the set of instructions and data directly executed by a computing system's central processing unit(s) or by a controller(s), a human-understandable form, such as source code, which may be compiled in order to be executed by a computing system's central processing unit(s) or by a controller(s), or an intermediate form, such as object code, which is produced by a compiler. As used herein, the term "software code" or "code" also includes any human-understandable computer instructions or set of instructions (e.g., a script) that may be executed on the fly with the aid of an interpreter executed by a computing system's central processing unit(s) or by a controller(s).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for providing supplemental hydraulic power for an electric work vehicle, the system comprising:
    an electric motor;
    a hydraulic pump coupled to the electric motor to allow the electric motor to rotationally drive the hydraulic pump, the hydraulic pump configured to supply pressurized hydraulic fluid through a hydraulic circuit to at least one hydraulic component of the electric work vehicle;
    a hydraulic accumulator configured to provide a temporary supply of pressurized hydraulic fluid within the hydraulic circuit;
    a control valve configured to regulate the temporary supply of pressurized hydraulic fluid from the hydraulic accumulator to the hydraulic circuit;
    a computing system communicatively coupled to the control valve, the computing system being configured to:
        determine that an operation of the at least one hydraulic component is to be adjusted;
        determine an operational status of the hydraulic pump;
        in response to determining that the hydraulic pump is in a low output state, control the operation of the control valve to fluidly connect the hydraulic accumulator to the hydraulic circuit to allow the hydraulic accumulator to provide the temporary supply of pressurized hydraulic fluid for adjusting the operation of the at least one hydraulic component; and
        control the operation of the control valve to fluidly disconnect the hydraulic accumulator from the hydraulic circuit after the operational status of the hydraulic pump has transitioned from the low output state to a normal output state.

2. The system of claim 1, further comprising an input device through which operator inputs are received for controlling the operation of the at least one hydraulic component, wherein the computing system is configured to determine that the operation of the at least one hydraulic component is to be adjusted upon receipt of an operator input from the input device that associated with adjusting the operation of the at least one hydraulic component.

3. The system of claim 2, wherein the computing system is configured to proportionally control the operation of the control valve based at least in part on a hydraulic demand associated with the operator input received from the input device.

4. The system of claim 1, wherein the computing system is configured to determine that the operation of the at least one hydraulic component is to be adjusted based at least in part on a predicted future adjustment of the at least one hydraulic component.

5. The system of claim 4, wherein the computing system is configured to determine the predicted future adjustment of the at least one hydraulic component based on one of a recognized pattern of adjustments associated with the at least one hydraulic component or a prescribed adjustment for the at least one hydraulic component.

6. The system of claim 1, further comprising a sensor configured to detect a parameter associated with the hydraulic fluid supplied through the hydraulic circuit, wherein the computing system is configured to proportionally control the operation of the control valve based at least in part on the detected parameter.

7. The system of claim 1, wherein the computing system is configured to control the operation of the control valve to fluidly disconnect the hydraulic accumulator from the hydraulic circuit after both: (1) the operational status of the hydraulic pump has transitioned from the low output state to the normal output state; and (2) the hydraulic accumulator has reached a predetermined charge pressure.

8. The system of claim 7, further comprising a pressure sensor configured to detect a charge pressure of the hydraulic accumulator, the computing system being communicatively coupled to the pressure sensor to allow the computing system to determine when the hydraulic accumulator has reached the predetermined charge pressure.

9. The system of claim 1, wherein the operational status of the hydraulic pump transitions from the low output state to the normal output state at one of a threshold output pressure, a threshold output rate, or a threshold operating speed for the hydraulic pump.

10. The system of claim 1, wherein the low output state includes an off state in which the hydraulic pump is not operating.

11. A method for providing supplemental hydraulic power for an electric work vehicle, the electric work vehicle including an electric motor and a hydraulic pump configured to be rotationally driven by the electric motor, the hydraulic pump being configured to supply pressurized hydraulic fluid through a hydraulic circuit to at least one hydraulic component of the electric work vehicle, the method comprising:

determining, with a computing system, that an operation of the at least one hydraulic component is to be adjusted;

determining, with the computing system, an operational status of the hydraulic pump;

in response to determining that the hydraulic pump is in a low output state, controlling, with the computing system, an operation of a control valve to fluidly connect a hydraulic accumulator to the hydraulic circuit to allow the hydraulic accumulator to provide a temporary supply of pressurized hydraulic fluid for adjusting the operation of the at least one hydraulic component; and controlling, with the computing system, the operation of the control valve to fluidly disconnect the hydraulic accumulator from the hydraulic circuit after the operational status of the hydraulic pump has transitioned from the low output state to a normal output state.

12. The method of claim 11, wherein determining that the operation of the at least one hydraulic component is to be adjusted comprising receiving an operator input from an input device that is associated with controlling the operation of the at least one hydraulic component.

13. The method of claim 12, wherein controlling the operation of the control valve comprises proportionally controlling the operation of the control valve based at least in part on a hydraulic demand associated with the operator input received from the input device.

14. The method of claim 11, wherein determining that the operation of the at least one hydraulic component is to be adjusted comprises predicting that future adjustment of the at least one hydraulic component will be made.

15. The method of claim 14, wherein predicting that the future adjustment of the at least one hydraulic component will be made comprises predicting the future adjustment based on one of a recognized pattern of adjustments associated with the at least one hydraulic component or a prescribed adjustment for the at least one hydraulic component.

16. The method of claim 11, wherein controlling the operation of the control valve comprises proportionally controlling the operation of the control valve based at least in part on a detected parameter associated with the hydraulic fluid supplied through the hydraulic circuit.

17. The method of claim 11, wherein controlling the operation of the control valve to fluidly disconnect the hydraulic accumulator from the hydraulic circuit comprises controlling the operation of the control valve to fluidly disconnect the hydraulic accumulator from the hydraulic circuit after both: (1) the operational status of the hydraulic pump has transitioned from the low output state to the normal output state; and (2) the hydraulic accumulator has reached a predetermined charge pressure.

18. The method of claim 17, further comprising monitoring a charge pressure of the hydraulic accumulator to determine when the hydraulic accumulator has reached the predetermined charge pressure.

19. The method of claim 11, wherein the operational status of the hydraulic pump transitions from the low output state to the normal output state at one of a threshold output pressure, a threshold output rate, or a threshold operating speed for the hydraulic pump.

20. The method of claim 11, wherein the low output state includes an off state in which the hydraulic pump is not operating.

* * * * *